B. D. WHITNEY.

Improvement in Band-Sawing Machines.

No. 126,602.  Patented May 7, 1872.

Witnesses:
A. Poole.
Henry Roberts

Inventor:
Baxter D. Whitney
by P. H. Woodruff, Atty.

126,602

UNITED STATES PATENT OFFICE.

BAXTER D. WHITNEY, OF WINCHENDON, MASSACHUSETTS.

IMPROVEMENT IN BAND-SAWING MACHINES.

Specification forming part of Letters Patent No. 126,602, dated May 7, 1872.

SPECIFICATION.

*To all to whom it may concern:*

Be it known that I, BAXTER D. WHITNEY, of Winchendon, in the county of Worcester and State of Massachusetts, have invented certain new and useful Improvements in Band-Sawing Machines for compensating for the expansion and contraction of the saw to prevent breaking; and the following is a full, clear, and exact description of the same, reference being had to the accompanying drawing making a part of this specification, in which—

Figure 1:
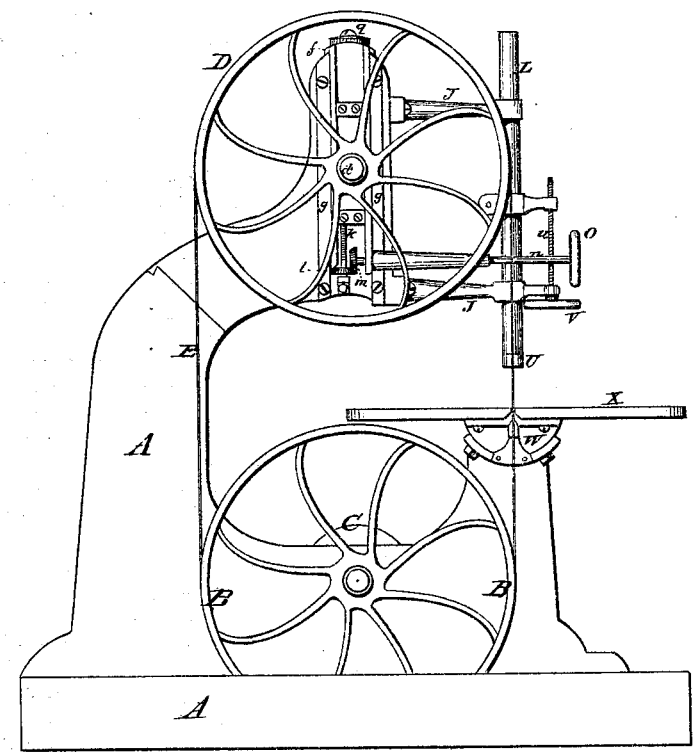
Figures 2, 3:
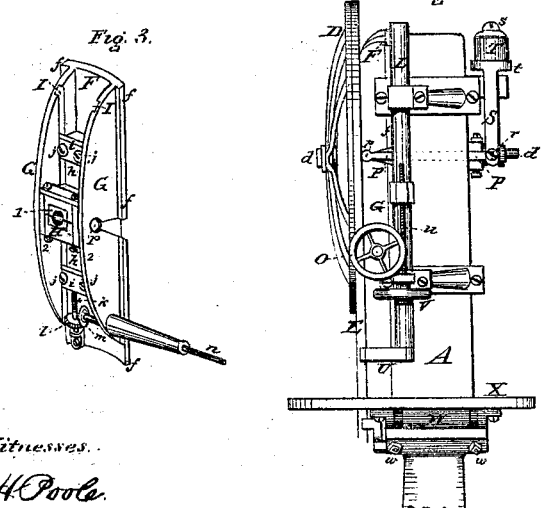
Figure 4:
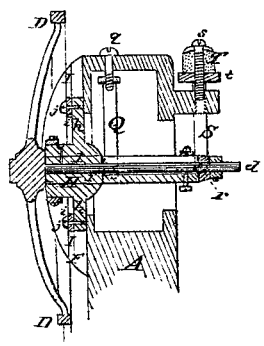

Figure 1 represents a side elevation of my machine with the band-saw in position, showing all its working mechanism. Fig. 2 is an end view of the machine, showing the part above the table. Fig. 3 is a detached view in perspective of the adjustable journal-head and the compensating plate to which it is attached. Fig. 4 is a section of the upper portion of the machine taken vertically through the axis of the upper wheel.

The object of my invention is to provide an apparatus by which a band-saw may be operated in such a manner as to maintain an equal tension under all circumstances of changes of temperature, which cause expansions and contractions in its length; and consists in the construction of mechanism hereinafter described.

A is the frame or stand, to which the operating parts are attached. B is the lower or driving-wheel, to which motion is communicated by the driving-pulley C, and which carries the band-saw E, in connection with the upper wheel D. F is the adjustable plate having vertical flanges G G, to which is attached the head H, holding the journal-boxes 1, which support the axis $d$ of the upper wheel D. The concave form of the wheel D admits of the center of the journal-box 1 being in the exact plane of the middle line of the rim or tire of the wheel D, and also of the saw E. The slides $f$ $f$ of the adjustable plate F fit the groove formed by the strips $g$ $g$, screwed to the upper part of the stand A, so as to allow it to slide vertically therein. The head H, with its projections $h$ $h$, has also a vertical movement in the flanged plate F by means of the guides $i$ $i$ fitting into the grooves I I, and secured by the screws $j$ $j$ to the projections $h$ $h$. This vertical movement is produced by the screw-shaft $k$ fitting into the lower projection of the head H, and turned by means of the bevel-gears $l$ and $m$, the latter being attached to the shaft $n$, which is operated by the hand-wheel O. The screws 2 2 in the under side of the head H are to adjust the line of the axis $d$ of the wheel D in its relation to the axis of the wheel B to cause the saw E to run in its proper place on the rim of the wheels B and D. The adjustable plate F is held and adjusted by means of a pair of levers, P P, pivoted at the points $p$ in the flanges G G, in which the pivots and lever ends are countersunk, the points $p$ being in the plane of the middle line of the rim of wheel D, and also of the saw E. The levers P P are suspended in the middle at the ends of an inverted stirrup, Q, attached to the top of the stand A by the adjustable screw $q$. The rear ends of the levers are also suspended or attached to another inverted stirrup, S, adjustable by means of the screw $s$, passing through the spring T resting on the circular head $t$ of the stirrup S, and screwing into the projection 3 on side of the stand A. The arms J J support the vertical bar L, provided with a foot, U, which can be adapted to any thickness of lumber by means of the micrometer-screw $u$, actuated by the hand-wheel V. The table X can be adjusted to any inclination desired for sawing bevels by means of the semi-cylindrical supporting-block W, regulated by the bolts $w$ $w$.

The operation of the machine is as follows: When the band-saw is to be placed upon the wheels for operation, the upper wheel is slightly lowered by turning the hand-wheel O in a direction to depress the journal-head H, and with it the axis of the wheel D. When in place, the saw is tightened by the reverse action of the hand-wheel, thus elevating the journal-head H till the wheel is sufficiently raised to produce the requisite tension; whereas, by reason of variations in temperature, expansion or contraction of the saw takes place, the slide F, carrying the journal of the wheel D, adjusts itself automatically to the strain or slackness of the saw by means of the levers P P, in connection with the spring T, the elasticity of which causes it to conform to the variations of the height of the axis $d$ of the wheel D.

In the event of a breakage of the saw rendering it necessary to be shortened by the lapping of the ends, the wheel D can be readily depressed to accommodate the reduced length by lowering the journal-head H by means of the above-described bevel-gear and screw-shaft $k$, actuated by the hand-wheel O.

What I claim as my invention, and desire to secure by Letters Patent, is—

1. The concave elastic saw, carrying wheels B and D, in combination with the adjusting and compensating devices herein specified, when the parts are arranged substantially as and for the purposes set forth.

2. The concave elastic saw, carrying wheels B and D, in combination with the shaft-adjusting mechanism or device, herein shown and described, when the said parts are arranged substantially as set forth.

BAXTER D. WHITNEY.

Witnesses:
C. H. POOLE,
J. B. WOODRUFF.